(12) United States Patent
Maslov et al.

(10) Patent No.: US 6,492,756 B1
(45) Date of Patent: Dec. 10, 2002

(54) ROTARY ELECTRIC MOTOR HAVING MAGNETICALLY ISOLATED STATOR AND ROTOR GROUPS

(75) Inventors: Boris Maslov, Reston, VA (US); Alexander Pyntikov, Ashburn, VA (US)

(73) Assignee: Wavecrest Laboratories, LLC, Herndon, VA (US)

( * ) Notice: Subject to any disclaimer, the term of this patent is extended or adjusted under 35 U.S.C. 154(b) by 0 days.

(21) Appl. No.: 09/826,423

(22) Filed: Apr. 5, 2001

Related U.S. Application Data

(60) Provisional application No. 60/194,594, filed on Apr. 5, 2000.

(51) Int. Cl.$^7$ .......................... H02K 21/12; H02K 1/00; H02K 1/12
(52) U.S. Cl. .......................... 310/156.12; 310/156.13; 310/259; 310/216
(58) Field of Search .................. 310/191, 209, 310/156.01, 156.03, 156.07, 156.12, 156.13, 156.15, 156.26, 156.33, 156.36, 156.37, 156.44, 156.48, 156.49, 156.51, 156.52, 156.54, 156.55, 156.59, 156.74, 254, 258, 259, 216, 218, 74

(56) References Cited

U.S. PATENT DOCUMENTS

| | | | | |
|---|---|---|---|---|
| 3,277,324 A | * | 10/1966 | Beaudoin et al. | 310/154.08 |
| 4,315,171 A | * | 2/1982 | Schaeffer | 310/12 |
| 4,591,746 A | * | 5/1986 | Kamiyama | 123/149 E |
| 4,719,382 A | * | 1/1988 | Listing | 310/177 |
| 4,754,207 A | | 6/1988 | Heidelberg et al. | 318/254 |
| 5,015,903 A | | 5/1991 | Hancock et al. | 310/168 |
| 5,164,623 A | | 11/1992 | Shkondin | 310/67 R |
| 5,918,360 A | | 7/1999 | Forbes et al. | 29/596 |
| 5,994,814 A | * | 11/1999 | Kawabata et al. | 310/156.18 |
| 6,093,984 A | * | 7/2000 | Shiga et al. | 310/156.05 |
| 6,094,011 A | | 7/2000 | Notsu | 315/78 |
| 6,278,216 B1 | | 8/2001 | Li | 310/254 |
| 6,380,646 B1 | * | 4/2002 | Bernauer et al. | 310/254 |
| 6,384,496 B1 | | 5/2002 | Pyntikov et al. | 310/68 B |

\* cited by examiner

*Primary Examiner*—Dang Dinh Le
(74) *Attorney, Agent, or Firm*—McDermott, Will & Emery

(57) ABSTRACT

A rotary direct current electric motor in which rotor and stator members are each configured as annular rings, concentric with respect to each other, about an axis of rotation. Either of the rotor or stator members is formed of groups of electromagnet pole pairs, the groups substantially equidistantly distributed along the angular extent of the annular ring, each of the groups comprising magnetic material magnetically isolated and separated from the other groups. The other member includes a plurality of permanent magnet poles substantially equidistantly distributed with alternating magnetic polarity along the angular extent of the radial air gap formed between the members, the permanent magnet poles having a discontinuous magnetic return path, thereby dividing the member into magnetically isolated groups of permanent magnet poles.

32 Claims, 8 Drawing Sheets

ROTARY ELECTRIC MOTOR HAVING MAGNETICALLY ISOLATED STATOR AND ROTOR GROUPS

RELATED APPLICATIONS

The present application claims priority of U.S. Provisional Patent Application Ser. No. 60/194,594, filed Apr. 5, 2000. This application contains subject matter related to applicants' copending U.S. application Ser. No. 09/571,174, filed May 16, 2000, and copending U.S. application Ser. No. 09/826,422, filed concurrently herewith.

FIELD OF THE INVENTION

The present invention relates to rotary electric motors, more particularly to motors having first and second annular ring members concentrically arranged about an axis of rotation and separated from each other by an axial air gap, both of the members comprising groups of magnetically isolated structures, the groups of one of the members having permanent magnets affixed thereto and the other of the members comprising wound electromagnet poles.

BACKGROUND

Direct current motors have versatility in a wide range of applications. The availability of a battery power source for dc motor equipped devices facilitates a portability aspect that is not readily available for a–c motor drives. Electronic controls, such as microcontroller and microprocessor based systems, for a wide variety of functional applications have become commonplace. As development of the battery has progressed, and the versatility of electronic controls has expanded, the challenge of providing efficient direct current motor drives for vehicles, as a viable alternative to combustion engines, has become more compelling. U.S. Pat. No. 5,164,623 to Shkondin is one example of a proposed implementation in which a motor is mounted on the wheel of a vehicle for directly driving the vehicle. The patent proposes that such an arrangement can be applicable to electric cars, bicycles, wheelchairs and the like.

Electronically controlled energization of windings of direct current motors offers the prospect of more flexible management of motor characteristics. The use of permanent magnets in conjunction with such windings is advantageous in limiting current consumption. U.S. Pat. No. 4,754,207 to Heidelberg et al. describes a direct current motor having a rotor composed of a continuous ring of a plurality of permanent magnets successively alternating in polarity. The stator, comprising a plurality of electronically switchable electromagnet poles, is circumferentially separated from the rotor magnets by a radial air gap. Several adjacent stator electromagnets form a phase group. The inward base portions of adjacent electromagnet poles in each group are in surface area contact with each other to form a continuous magnetic flux path. The electromagnetic circuit is broken at transition points between adjacent groups of electromagnets. Sensors detect relative rotational position between rotor and stator elements to control electronic switching of the individual electromagnet windings. Electromagnets belonging to a common group are switched simultaneously with one common electronic switching means per group. Windings of the electromagnets in adjacent groups are of different phases and are switched at different times.

Of concern in implementation of stator winding switched energization is the avoidance of unfavorable consequences such as rotation irregularities. For example, simultaneous switching of all motor phase windings can cause pulsating output torque. Alleviation of these effects, with varying success, can be obtained by appropriately switching all phases at different times or by simultaneously switching certain winding combinations that are distributed symmetrically about the stator periphery and bear certain positional relationships with the permanent magnet poles of the rotor. However, switching of adjacent windings at different times leads to detrimental effects if the windings are linked to a continuous magnetic circuit path, as the flux changes due to the changed energization of the winding of one pole effects the flux of an adjacent pole.

Heidelberg et al. alleviates this problem to some extent by grouping pluralities of stator poles in separate magnetic circuit paths. The magnetic circuit path discontinuity between adjacent groups effects an isolation of magnetic flux, thus reducing transformer like magnetic flux interference between groups. However, where all poles of a group are wound and switched simultaneously, a torque ripple effect can still exist. Heidelberg et al. provides modifications in which some poles of a group are not wound and/or the pole structure of all poles within a group are not of uniform configuration, thus deterring the effects of torque ripple and flux interference between adjacent poles. Such modifications sacrifice torque characteristics and power capability. If fewer poles are wound, flux generation capability is reduced. The unwound poles do not contribute to torque and can detrimentally interact with rotor permanent magnets. Non-uniform pole configuration modifications in Heidelberg et al. are coupled with non-uniform pole windings. Such configurations complicate the manufacturing process and compromise motor efficiency.

The above-identified copending related U.S. patent application Ser. No. 09/826,422 identifies and addresses the need for an improved motor amenable to simplified manufacture and capable of efficient flexible operating characteristics. In the particular vehicle drive environment, it is highly desirable to attain smooth operation over a wide speed range, while maintaining a high torque output capability at minimum power consumption. Such a vehicle motor drive should advantageously provide ready accessibility to the various structural components for replacement of parts at a minimum of inconvenience. The copending related U.S. application incorporates electromagnet poles as isolated magnetic structures configured in a thin annular ring to provide advantageous effects. With this arrangement, flux can be concentrated, with virtually no loss or deleterious transformer interference effects in the electromagnet cores, as compared with prior art embodiments. While improvements in torque characteristics and efficiency are attainable with the structure of the identified copending application, further improvements remain as an objective.

DISCLOSURE OF THE INVENTION

The present invention fulfills the above-described needs and provides further advantages. A rotary electric motor comprises rotor and stator members each configured as annular rings and concentric with respect to each other about an axis of rotation. Either of the rotor or stator members is formed of groups of electromagnet pole pairs, the groups substantially equidistantly distributed along the angular extent of the annular ring, each of the groups comprising magnetic material magnetically isolated and separated from the other groups. The other member comprises a plurality of groups of permanent magnet poles substantially equidistantly distributed with alternating magnetic polarity along the angular extent of the radial air gap formed between the members. The groups of permanent magnet poles each comprise a common magnetic return path that is separate and magnetically isolated from adjacent permanent magnet pole groups. The poles of each group of electromagnet pole pairs are wound, the windings together being switchably energized for driving electromotive interaction between the stator and rotor. Thus, an even number of poles, two per pole pair, are provided for each electromagnet group. The poles of each pole pair are oppositely wound to provide opposite north/south polarities.

As described in the related copending application, isolation of the electromagnet groups permits individual concentration of flux in the magnetic cores of the groups, with virtually no flux loss or deleterious transformer interference effects with other electromagnet members. Operational advantages can be gained by configuring a single pole pair as an isolated electromagnet group. Magnetic path isolation of the individual pole pair from other pole groups eliminates a flux transformer effect on an adjacent group when the energization of the pole pair windings is switched. The lack of additional poles within the group eliminates precludes any such effects within a group.

By appropriately timing the switched winding energization for each of the pole pair groups, development of smooth electromotive force throughout the motor is attained. A precise optimum phase and sequence for timed switching of particular pole pair groups is dependent upon the particular structural configuration of electromagnetic poles, permanent magnet poles, spacing among various poles and other structural interrelationships. Upon determination of the optimum timed switching sequence for a specific motor configuration, implementation of a switching scheme can be made dependent upon relative position between rotor and stator. Switching may be performed by a mechanical commutator or electronic activation in response to signals generated by a position sensor. A wide variety of suitable sensors are well known in the art including, merely by way of example, reed switch sensors, capacitive sensors, hall effect sensors, optical sensors, and pulse wire sensors. Microprocessor controlled electronic switching affords precisely adjustable speed in a light weight structure. While various position sensing means are well known in the art, any of which may be employed to generate such signals, the use of a resolver has been found to be preferable. The resolver output can then be used by an encoder to encode signals for application to a microcontroller or microprocessor based control circuit.

The embodiments of the present invention provide yet additional advantages. The propulsion system comprises as main structural constituents, an electromagnet subsystem, permanent magnet clusters and enclosing back iron ring sections for the permanent magnet clusters. The permanent magnets and the ring portions form the rotor part of the motor, the permanent magnets being positioned inside the back iron ring sections.

Parameters of interest in the rotor are the grade of the magnet, the energy density and the overall magnetic characteristics of the magnet grade, the size and the dimensions of the magnet that can adjust the permanence and the overall operating condition of the magnet when it is part of the rotor, the temperature stability of the magnet, the finishing, coating and post processing steps taken in manufacturing of the magnets for the intended application, the stability of the magnetisation over the curvilinear surface of the magnet, uniformity of the radial polarisation of the magnet, the adjacent gap between two separate magnets, the mechanical features of the edges of the magnets, and the return flux path of the magnet as provided by the back iron ring section. The back iron ring sections are predominately a soft magnetic medium. They can be manufactured by various techniques from cast, compacted, sintered or powdered materials as well as ferromagnetic soft magnetic laminated silicon steels. For optimal operation, the back iron should have a high permeability and saturation flux density level preferably around 2.5 T.

In a configuration in which permanent magnets are fixed to a continuous back iron ring, such as in the above described copending application Ser. No. 09/826,422, with no excitation applied to any of the electromagnet phases, an equilibrium exists. The continuous iron ring experiences full magnetic flux saturation at the regions behind the regions where there are adjacent gaps between two magnets. If the ring is examined carefully, this flux saturation pattern is repeated within the bulk of the ring. The saturation flux density can be within 2.0 to 2.3 T. The dimension and the material grade of the iron ring can be modified in order to reduce saturation intensity. Under no electromagnet excitation the flux distribution pattern in the back iron ring is stable (not modulated), although subtle nominal variations could exist as there may be some negligible variations in the energy density values of each magnet positioned in the subassembly. However, during the excitation cycles of a given phase of the motor, a magnetic potential difference tends to build up between the poles of the electromagnet and the corresponding coupling permanent magnet. This potential differential tends to alter the flux pattern in the corresponding segment return path of the magnet. As this effect is localized, only the corresponding segment of the back iron path would experience a subtle reduction in the intensity of flux saturation. Since the excitation current is modulated under a specific PWM scheme, the reduction in the intensity of the saturation would undergo the same modulation pattern as the excitation. However, this variation is frequency dependent and is proportional to several key factors: 1. the frequency of the switching of each phase 2. the fundamental frequency of the PWM scheme and 3. the changing electrical duty cycle per phase. All of these effects contribute to the development and the propagation and modulation of strong eddy currents in the iron path and hence a skin effect within the bulk of the iron ring. These eddy currents tend to propagate around the path of the back iron and hence upset the equilibrium of other segments and hence cause unwanted lags in the excitation currents of other phases. The most dominant effect is the eddy current losses which are caused in the bulk of the iron path. The intensity of this eddy current loss can be mitigated by increasing the inherent electrical resistivity (or reducing the electrical conductivity of the material), or by changing the grade and the geometry or the placement of the back iron path, or by inducing barriers to the flow of the eddy currents. If the losses are predominant, one method of reducing the eddy currents would be to use laminated steel construction. However, as the iron ring is shared by all of the magnets, this alone my not entirely address the problem.

A solution of the present invention is to divide each back iron into segments (proportional to the pitch of a magnet cluster) such that there is a physical air gap between the back iron segments of two adjacent magnet clusters. Although this may reduce the effective flux link between the two adjacent magnets of different clusters (and in turn in the whole back iron ring), it isolates the effects of the eddy current along its propagation path. The orientation of these gaps in the back iron are configured to achieve the desired operation of the design.

With the additional isolation of permanent magnet groups, flux fields of both stator and rotor components are thus concentrated and focussed at the air gap for optimum electromotive interaction. Such interaction is particularly effective when the number of poles in each of the electromagnet and permanent magnet groups is the same. The maximum number of groups can be realized by employing two poles in each group. Interaction between single isolated pole pairs of the electromagnet member and permanent magnet member for all groups along the air gap contributes to high torque capability with efficient operation. Such efficiency coupled with light weight electronically switched winding energization significantly extends battery life.

While the present invention has useful applicability in various motor drive applications, it is advantageously suitable for a vehicle drive in which the rotor is structured to surround the stator, the rotor being secured to a housing for direct attachment to a vehicle wheel. The annular rotor is thus at a substantial radial distance from the axis of rotation. The rotor housing is journalled for rotation about a stationary shaft at the axis of rotation through bearings. In an embodiment in which the rotor comprises permanent magnets, a large number of groups of permanent magnets can be substantially evenly distributed along the annular ring, affixed to a ring of nonmagnetic material such as aluminum. As a programmed microprocessor has the capability of generating extremely high rate of switching signals, a wide vehicle speed and torque range is available without need for transmission gear shifting. The groups of separate electromagnets form a relatively thin annular stator ring that is spaced from the axis of rotation by a radial distance, which preferably is substantially greater than the radial dimension between inner and outer diameter boundaries of the stator ring. The separated groups of electromagnets are removably secured to plate members that are also affixed to the stationary shaft. The configuration of the present invention, wherein electromagnet poles form isolated magnetic structures formed in a thin annular ring, has been found to provide further advantageous effects. With this arrangement, flux can be concentrated, with virtually no loss or deleterious transformer interference effects, at the radial air gap for optimum interaction with the permanent magnet rotor. As a result, extremely high torque is available with a high efficiency that significantly extends battery life.

The stator structure of the present invention provides an additional advantage in that access to and replacement of an individual stator group is facilitated. Thus, if a particular stator winding group should become damaged, for example by a fault in the pole structure or winding, the individual stator group can be replaced without removing or replacing the entire stator unit. As a related advantage, it has been found that use of a large number of single pole pair stator groups and rotor groups permits the motor to continue to operate in a satisfactory manner even if a particular electromagnet pole group energization fails.

A further advantage of the present invention is that, to a large extent, stator and rotor pole face dimensions and spacings between poles are relatively independent of each other. A timed switched energization scheme can be programmed to be optimized for a particular structural configuration. In the preferred vehicle drive embodiment, described above, an odd number of stator groups is utilized. The stator poles have pole faces at the air gap that are of substantially uniform angular extent. The permanent magnet rotor pole faces are of substantially equal angular dimensional extent at the air gap, which is different from the stator pole face dimension. The angular distance between the centers of the pole faces within each stator group is substantially uniform throughout the periphery of the stator and differs from the angular distance between the centers of the stator pole faces of adjacent groups. The angular distance between the centers of the pole faces of each stator group also is different from the angular distance between the centers of adjacent permanent magnet poles of the rotor. Gaps between adjacent stator pole faces within each group are substantially equal for all groups and different from gaps between adjacent stator groups. The rotor pole faces are separated substantially uniformly by gaps, both within and between groups, the gaps between adjacent rotor pole faces preferably being different from the gaps between adjacent stator pole face within a stator group.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
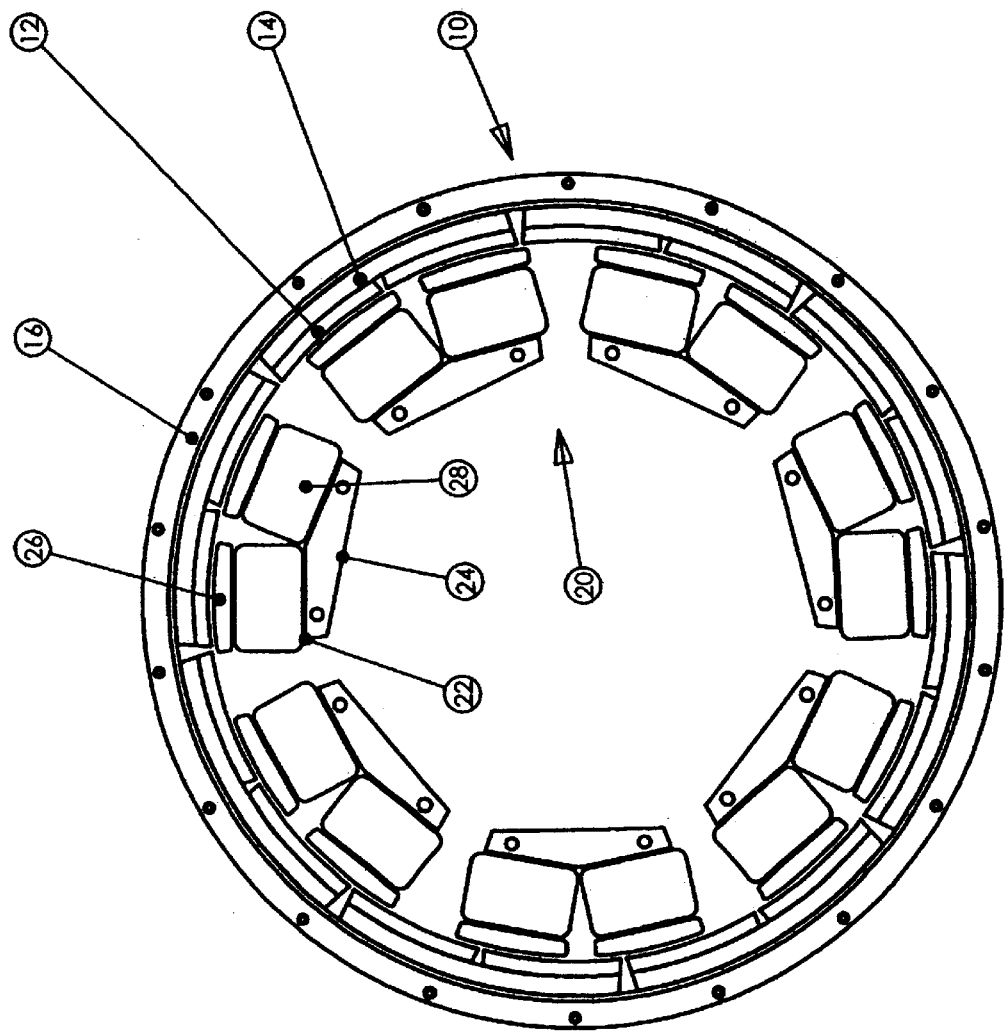
FIG. 1 is a plan diagram of a stator and rotor layout of a preferred embodiment of the motor of the present invention.

FIG. 1 is a plan diagram of a stator and rotor layout of a preferred embodiment of the motor of the present invention. Rotor member 10 is an annular ring structure having sixteen permanent magnets 12 substantially evenly distributed. The permanent magnets are divided into eight groups of north/south pole pairs, the permanent magnets of each group joined by magnetically permeable material 14 that serves as a magnetic return path between the adjacent permanent magnetic poles 12. The permanent magnet groups each form a magnetic circuit that is isolated from adjacent groups. Cylindrical back plate 16, of non-magnetically permeable material such as aluminum, joins the permanent magnet groups to form the annular ring. The permanent magnets are rotor poles that alternate in magnetic polarity along the inner periphery of the annular ring. The rotor surrounds a stator member 20, the rotor and stator members being separated by a radial air gap. Stator 20 comprises seven elements or groups of poles 22 of uniform construction that are evenly distributed along the air gap. Each stator group comprises a generally u-shaped magnetic structure 24 having two pole faces 26 at the air gap. Each stator group structure is separate, and magnetically isolated, from adjacent groups. The legs of the poles are wound with windings 28. The windings of each stator group are connected together so as to be simultaneously activated when connected to a dc source of energization. The windings are configured to provide opposite north/south polarities to the poles of each pole pair, thereby forming an electromagnet. Reversal of polarity of energization effects reversal of the magnetic polarities of the pole pair. Appropriate timed switching of stator winding energization along the radial air gap effects electromotive force generation through interaction of magnetic forces between the stator and rotor across the air gap.

The rotor permanent magnet poles are all of uniform angular extent along the air gap and separated from each other by angular gaps of uniform extent. Thus, the gaps between poles of adjacent permanent magnet groups are of the same dimension as the gaps between permanent magnet poles within the groups. Subject to these uniformity relationships, the actual dimensions of the rotor pole faces and gaps therebetween are variable and can be optimized in accordance with application environment. It is to be understood that any even number of rotor poles and groups may be employed, the arrangement being shown in FIG. 1 simply for purposes of illustration. The stator pole faces are all of uniform angular extent, preferably of a different dimension than that of the rotor angular pole face.

Stator elements 24 are secured, in a manner more fully described hereinafter, to non magnetically permeable support structure, whereby the stator elements form an annular ring configuration. The poles within each stator group are separated by radial gaps that are uniform for all stator groups. The extent of these gaps is different from the spacing between poles of adjacent stator groups. The stator pole gaps and group spacings are each different from the rotor angular pole gaps. The radial extent of the stator annular structure, i.e., the distance between inner and outer diameters, is substantially less than the distance between the center axis of rotation and the inner diameter of the stator. This relatively narrow radial stator dimension provides a favorable concentration of flux within each stator element structure focussed at the air gap. By virtue of this configuration, and the absence of stray transformer flux effects from adjacent stator pole groups, high torque output can be efficiently obtained.

The relatively independent dimensional relationships between the stator and rotor poles permits flexibility in setting the number of poles and dimensions. While an odd number of stator pole groups is preferred to enable optimum performance, this number is by no means limited to seven, as shown for purposes of illustration. Similarly, each stator pole group may comprise a plurality of pole pairs sharing a common isolated magnetically permeable structure, preferably with an even number of poles in each group. In an operational environment in which it is desirable to obtain fine control over a wide speed range, a large number of stator and rotor poles can be implemented. Such implementation can be coordinated with the control capabilities of control system to be used, the number of separate stator groups also being set accordingly. Although the motor can support a variety of specific applications, the invention is of particular advantageous utility for driving a vehicle, wherein the motor structure is housed within a wheel. The concentric rotor and stator members in such an environment are located at the wheel rim, at a substantial radial distance from the axis of rotation. The large rim diameter provides ample room to accommodate a large plurality of individual rotor and stator poles, thus facilitating flexibility of control.

Figure 2:
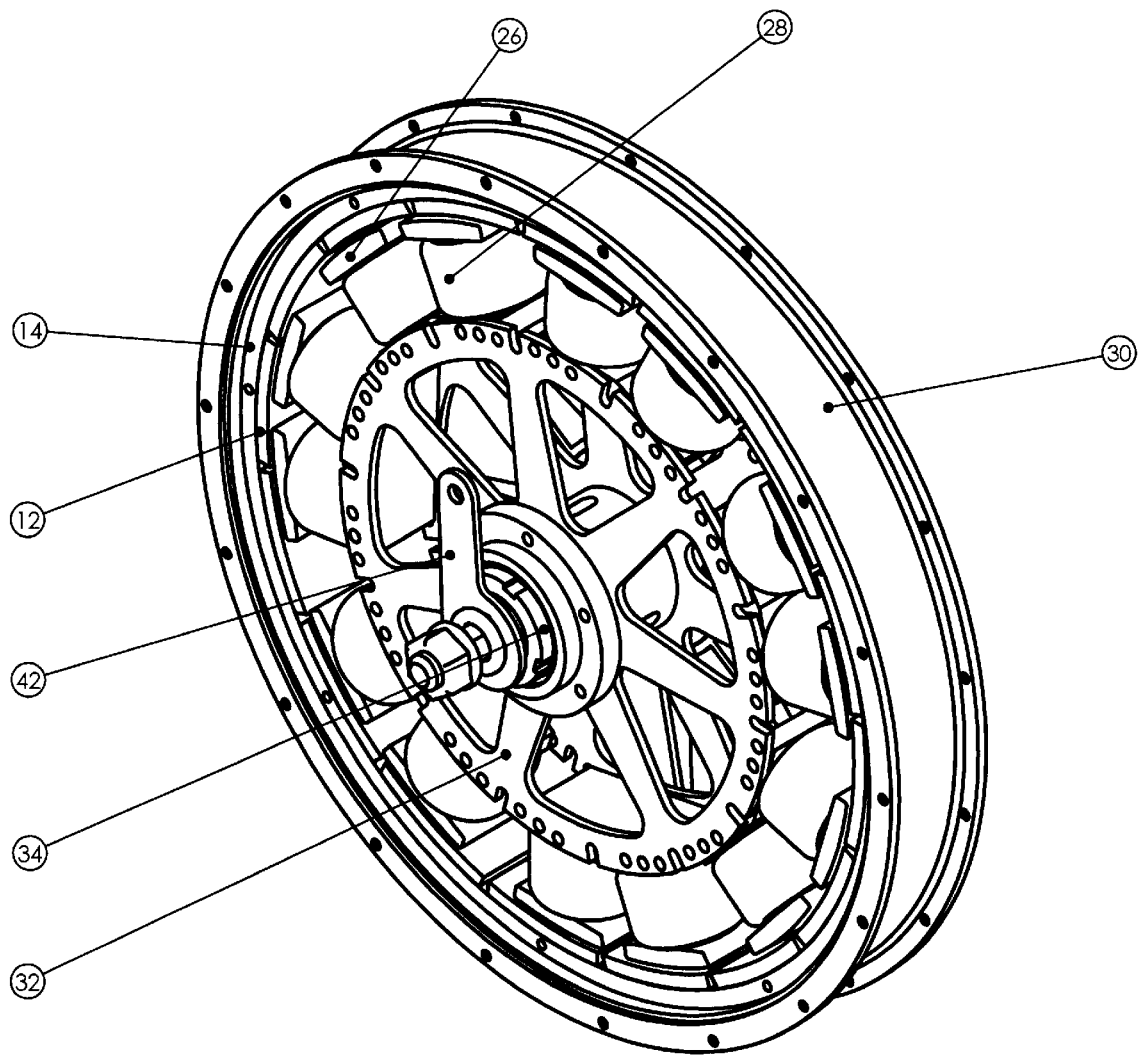
FIG. 2 is three dimensional perspective diagram of the stator and rotor pole structure of the embodiment of FIG. 1.

FIG. 2 is a perspective view of a rotor and stator assembly of the motor embodiment of FIG. 1. The annular rotor, including cylindrical back plate 16 that supports the permanent magnet groups, is enclosed by a ring housing member 30, which may be formed of aluminum or other non magnetically permeable material. Within this cylindrical rotor structure, the stator groups are rigidly secured by two plates 32, only one of which is shown in the drawing. Each plate 32 is of a rigid circular configuration having an outer diameter and a circular cutout portion at its center that forms an inner diameter. The inner diameter is sized to fit stationary shaft 34 and to be affixed to a shaft member. Along the plate periphery, the plate is provided with holes appropriately spaced to mate with corresponding through holes in the stator elements. Each of the plates 32 is secured to the shaft 34 and spaced from each other appropriately to be secured to, and to sandwich, the pole structures 24 of the stator elements at each axial side thereof via the mating holes. The plates can be selectably removable to facilitate access and replacement of an individual stator element that may become damaged or in need of repair, without replacement of the entire unit. As each of the stator elements can be made interchangeable, maintenance of the stator is a relatively simple matter of inserting a spare stator element at the appropriate mating position between the plates and connecting the ends of the windings.

Figure 3:
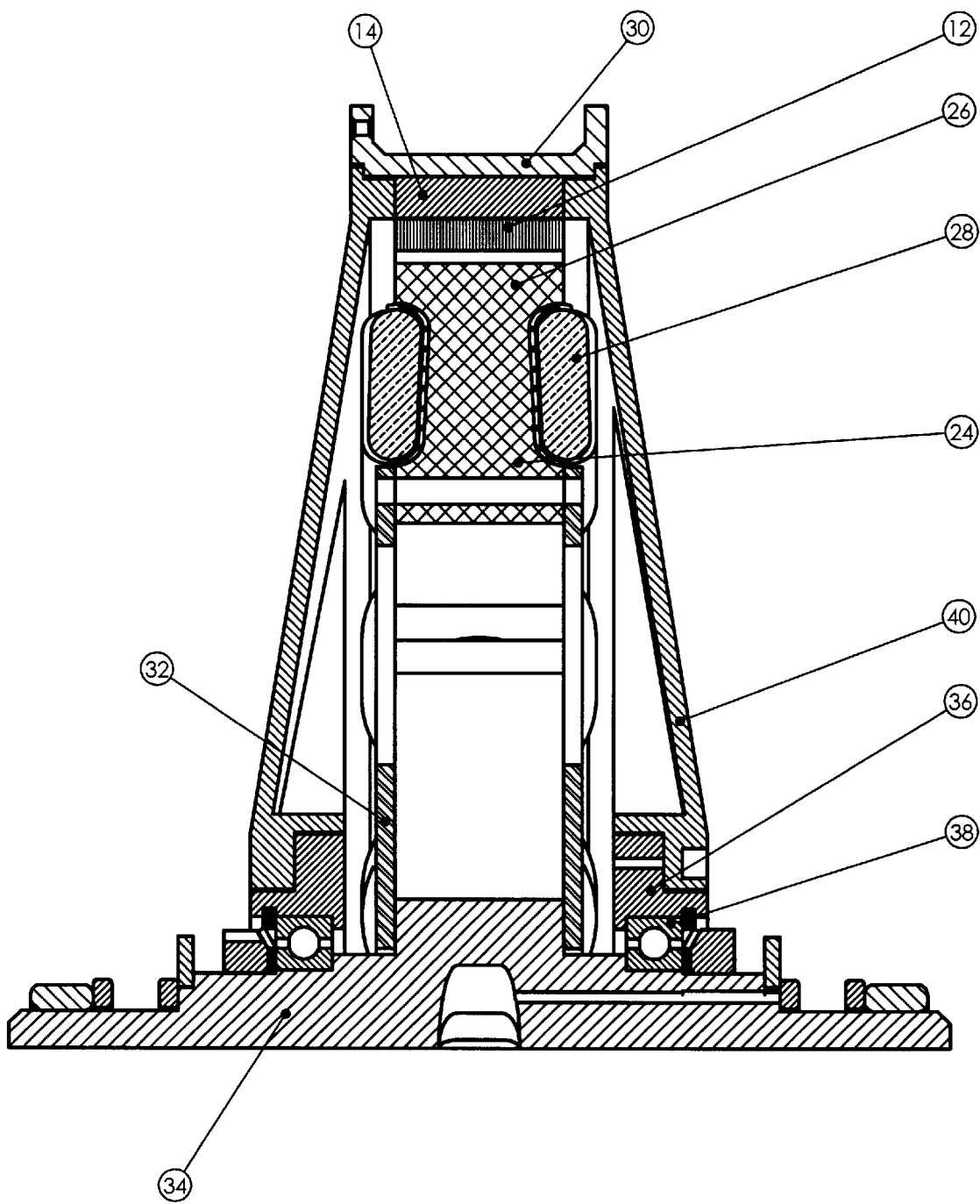
FIG. 3 is a partial detailed sectional diagram illustrating the motor structure of the invention, particularly suitable for use in driving a vehicle wheel.
Figure 4:
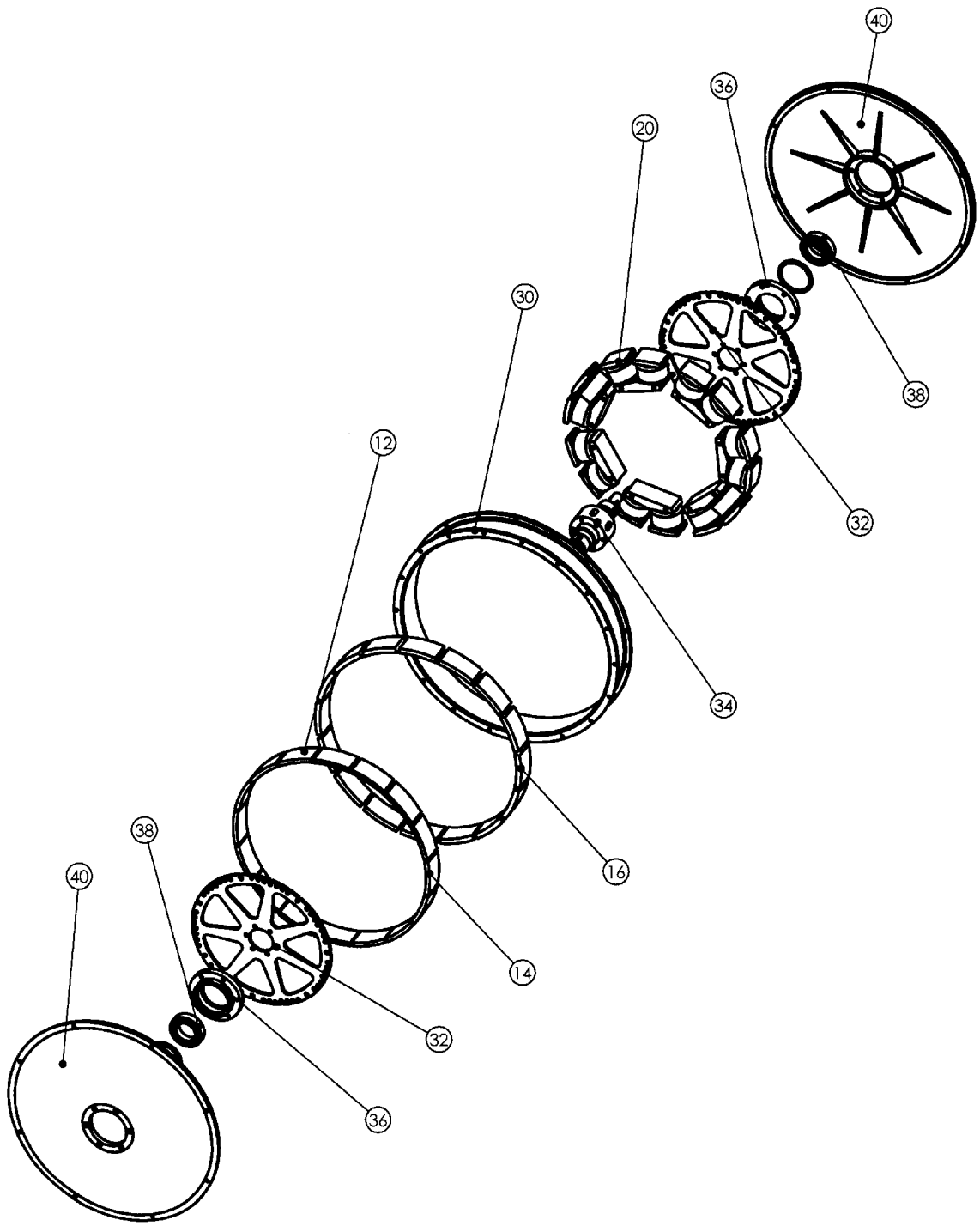
FIG. 4 is an exploded view of the motor structure shown partially in section in FIG. 3.
Figure 5:
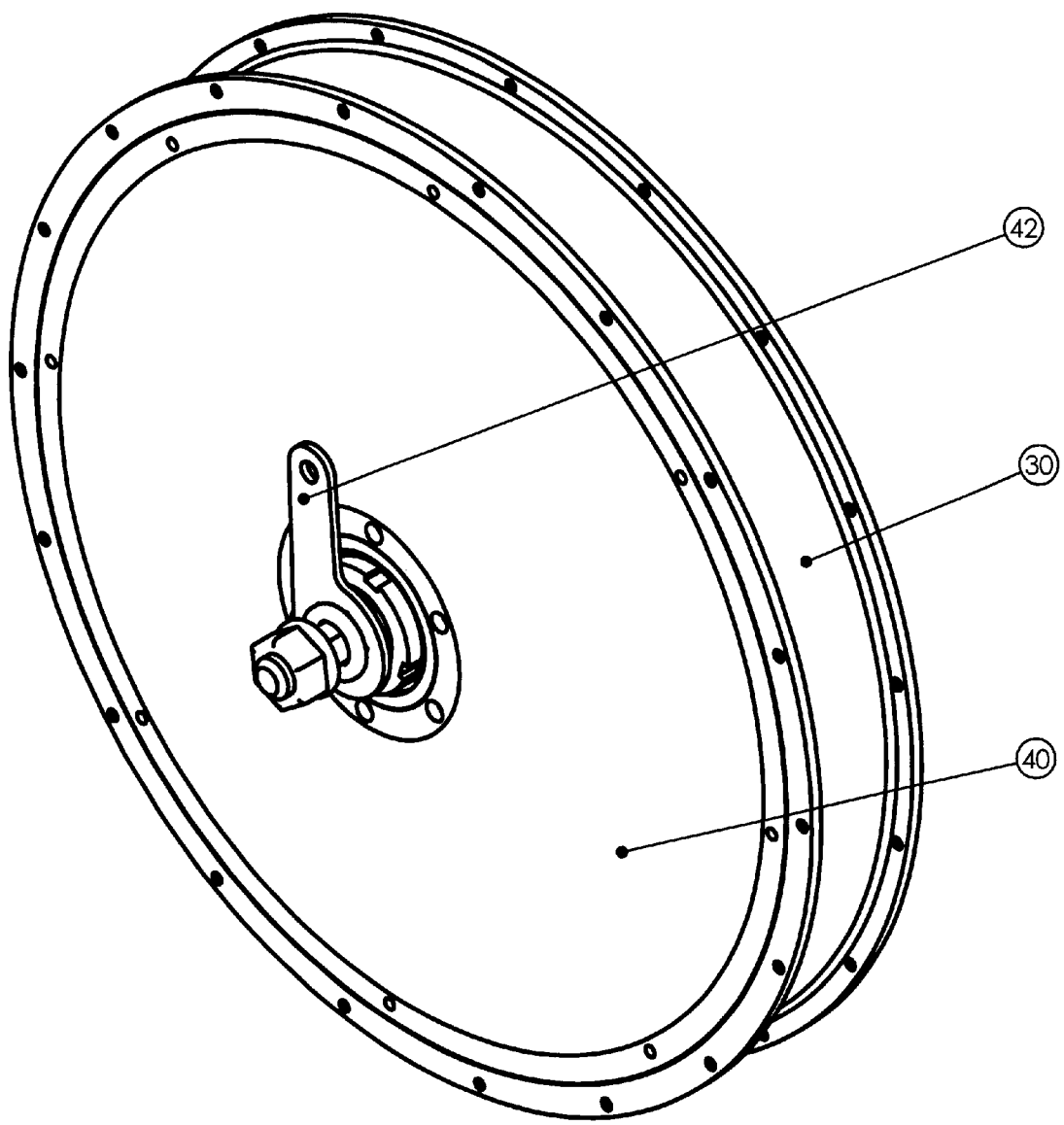
FIG. 5 is a perspective outside view of an assembled wheel hub housing enclosing the motor in accordance with the present invention.

FIG. 3 is a more detailed sectional diagram illustrating the motor structure of this embodiment of the invention, particularly suitable for use in driving a vehicle wheel of an automobile, motorcycle, bicycle, or the like. The stationary shaft 34, plates 32, stator structures 24 and windings 28, are contained within housing 40, to which annular rotor backplate 14 and permanent magnets 12 are attached. Housing 40 is journalled to the shaft on each side of plates 32 through bushings 36 and bearings 38. Thus housing 40 forms side portions of a vehicle wheel that rotates, as driven through the rotor, about shaft 34. The ring housing member 30 is rigidly attached to housing 40 and the rotor, and functions as a rim for fitting a vehicle tire. FIG. 4 is an exploded view of the motor structure of FIG. 3, while FIG. 5 is a three dimensional perspective outside view of the assembled wheel hub portion. Connector portions 42 are provided to illustrate use of the motor in a bicycle type environment each of connector portions 42 can be affixed to a respective portion of a bicycle fork. The drawing figures also exemplify the use of various standard washer, nut and bolt elements for assembling various elements. It is to be understood that any appropriate means well known in the art can be used for assembly of the various elements.

Figure 6:
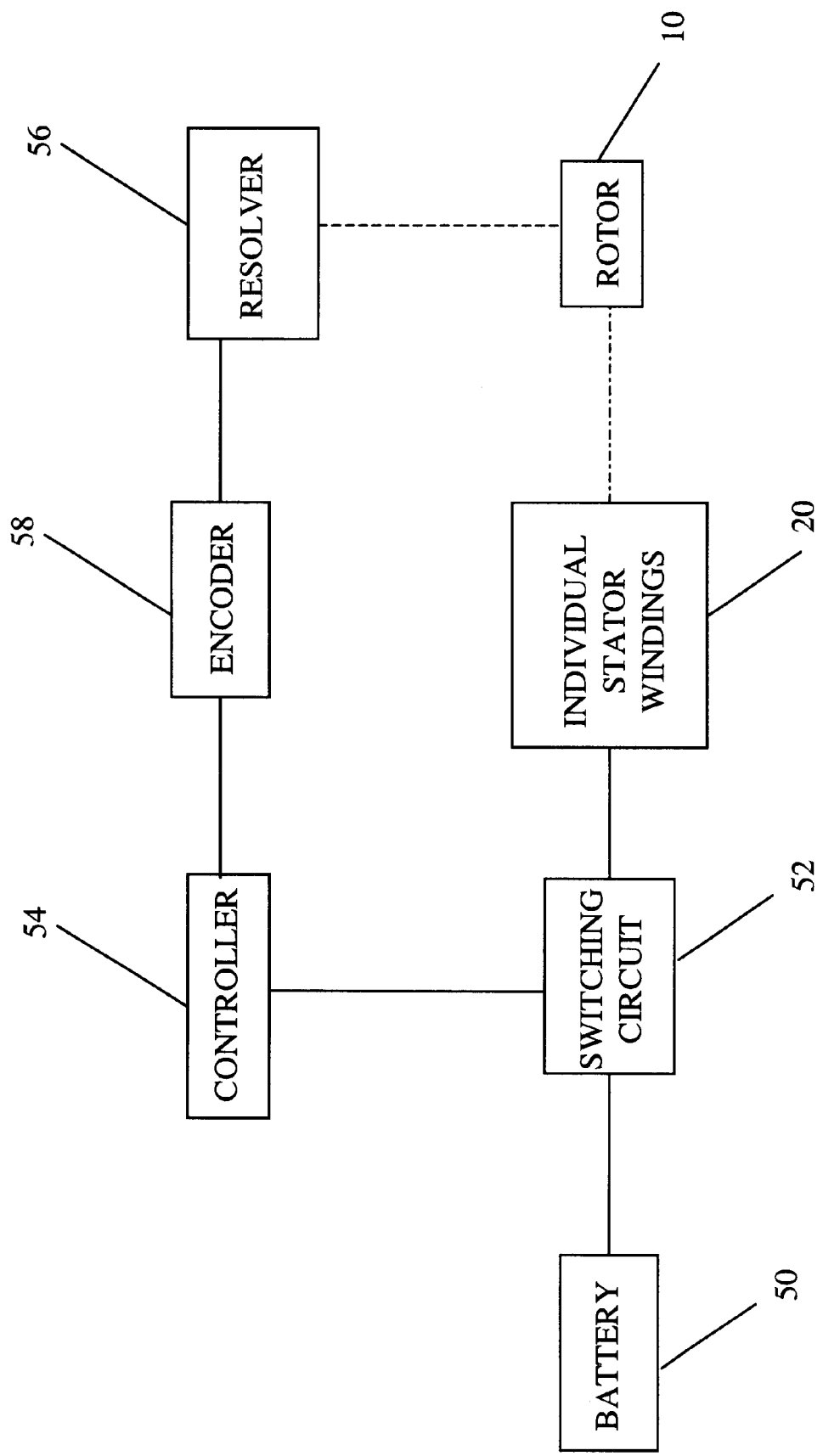
FIG. 6 is a block diagram illustrative of a control system for driving the motor of the present invention.

FIG. 6 is a block diagram illustrative of a control system for driving the motor of the invention of the embodiment of FIG. 1. Energizing current for the individual stator electromagnet windings 20 is provided by battery supply source 50. Although switched energization of the stator windings can be implemented using a well known mechanical commutator arrangement, electronic switching circuits have become commonplace and provide superior control advantages. It is preferable, therefore, to connect stator windings 20 to battery 50 through switching circuit 52. Switching circuit 52 may comprise any well known controlled bidirectional electronic circuit capable of supplying battery energization, switchable in polarity, individually to the motor windings, under control of controller 54. Controller 54 preferably comprises a microcontroller, microprocessor or the like that can be programmed to apply appropriately timed control signals to switching circuit 52 in accordance with feedback signals generated in response to the relative movement between stator and rotor. Various position sensors are known in the art that are capable of producing motor feedback signals for utilization by the controller. Resolver 56 is coupled to rotate with rotor 10 and generates signals indicative of rotor angular position. These signals are encoded by encoder 58 appropriately for use by the controller. The controller can be programmed to output optimally timed control signals to be matched with the received encoder signals, based on the specific dimensional configuration of the stator elements. Programming can thus take into account the number of stator and rotor poles, the number of stator groupings, the dimensions of the stator and rotor poles and the dimensions of the various gaps in the motor structure. It has been found that the superior motor torque and speed characteristics obtained from the above described structure operating in the optimally programmed controlled electronic switched mode enables satisfactory operation even if one or more individual stator element groups cannot function. Thus a vehicle in such circumstance can continue to be used until such time as it is convenient to replace a stator element part.

Figure 7:
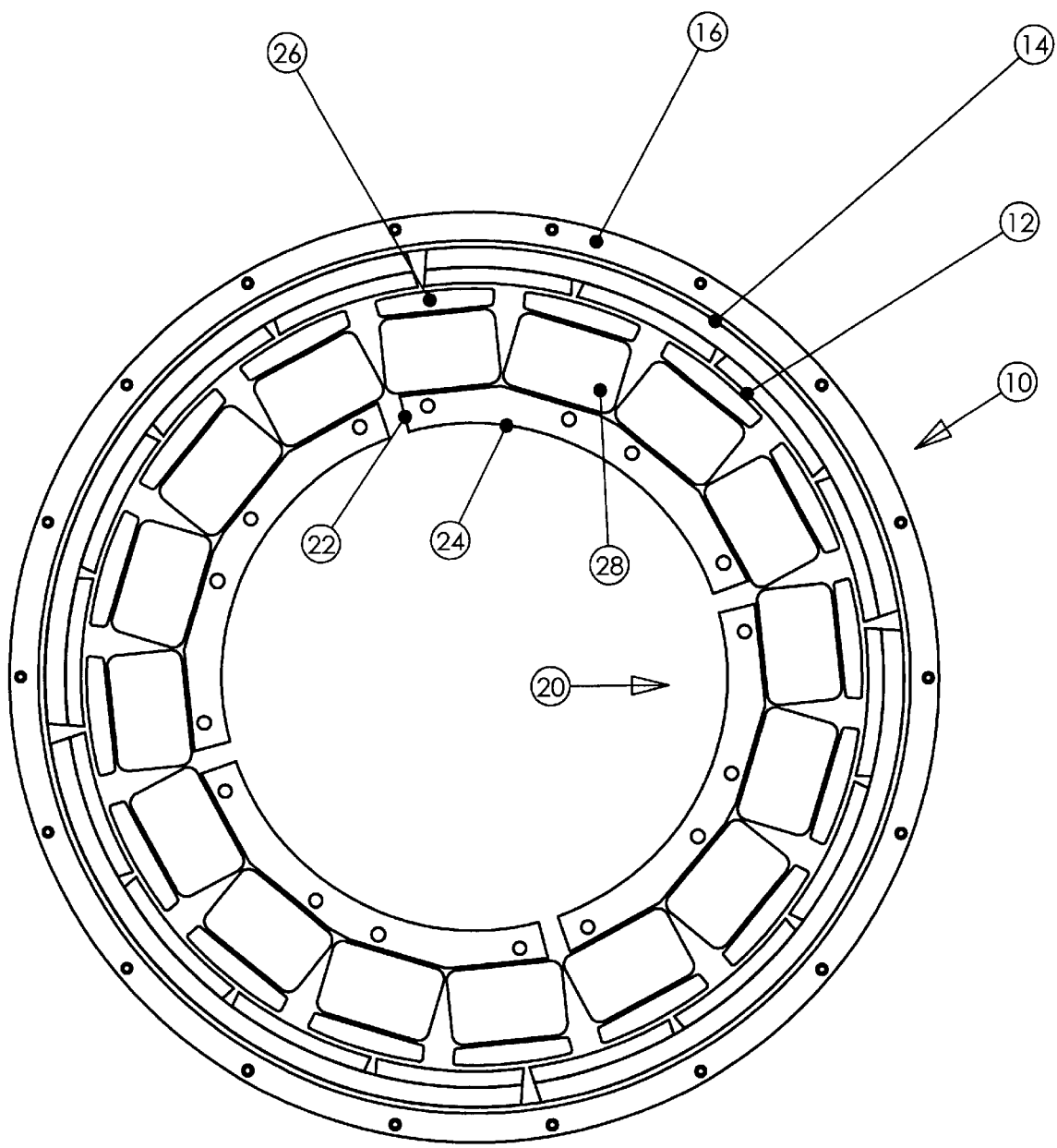
FIG. 7 is a plan diagram of a stator and rotor layout of a another embodiment of the motor of the present invention.

FIG. 7 is a plan diagram of a stator and rotor layout of a another embodiment of the motor of the present invention. Four stator groups 22 are each separately formed of isolated magnetically permeable material 24 to form four salient poles 26 having windings thereon when energized to form magnetic poles of alternating polarity. The rotor comprises four groups of permanent magnets. Each group contains four permanent magnets 12 affixed in successively alternating magnetic polarity to magnetically permeable material 14. The magnetic path of each rotor group is isolated from adjoining rotor groups. In this embodiment, both rotor and stator comprise four groups of poles for a total of sixteen poles. This arrangement is thus contrasted with the embodiment of FIG. 1, wherein an odd number of stator groups and an even number of rotor groups are configured. In addition, in FIG. 7 the spacing between poles of adjacent stator groups is of a more similar dimension to the spacing between adjacent poles within a stator group than is the case in FIG. 1. These differences are variables that are adjusted to conform to the expected requirements of the particular environment to which the motor is to be applied. The motor of FIG. 7 may be structurally incorporated within a vehicle wheel in the manner illustrated in FIGS. 2–5.

Figure 8:
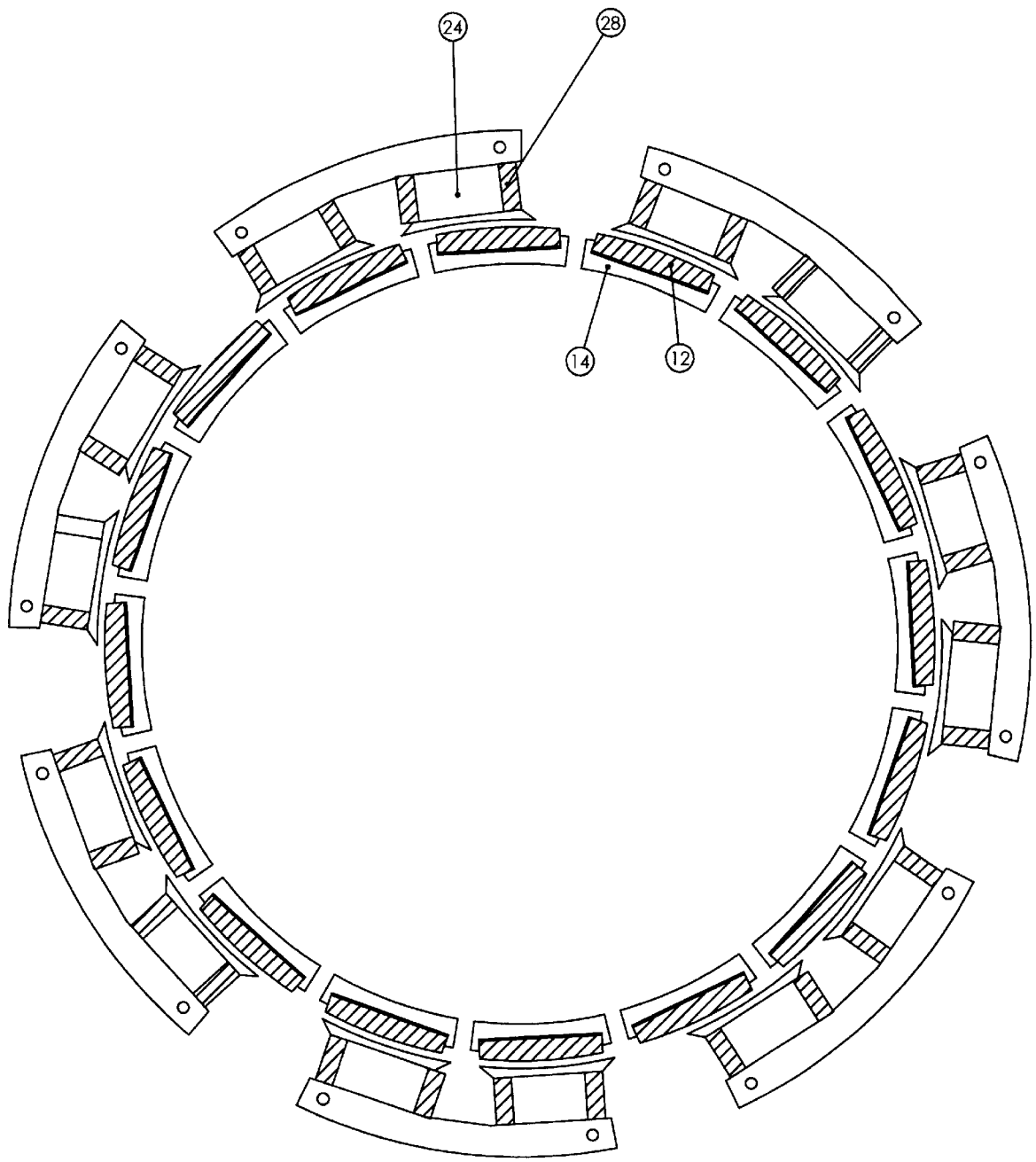
FIG. 8 is a schematic plan view of an alternative embodiment of the present invention in which the rotor comprises separate electromagnet groups of pole pairs which surround via a radial air gap a permanent magnet stator.

FIG. 8 is a schematic plan view of an embodiment in which the rotor comprises separate electromagnet groups of pole pairs which surround via a radial air gap a permanent magnet stator having a discontinuous magnetic path to form isolated groups of poles. This embodiment otherwise is structurally and functionally the same as that of FIG. 1 and may be structurally embodied in a vehicle wheel environment in the manner illustrated in FIGS. 2–5.

In this disclosure there is shown and described only preferred embodiments of the invention and but a few examples of its versatility. It is to be understood that the invention is capable of use in various other combinations and environments and is capable of changes or modifications within the scope of the inventive concept as expressed herein. For example, as can be appreciated, the motor of the invention can be utilized in a wide range of applications in addition to vehicle drives. While it is preferred, in the implementation of a vehicle drive, that the rotor surround the stator, other applications may find advantageous utility with the stator surrounding the stator. Thus, it is within the contemplation of the invention that each inner and outer annular member may comprise either the stator or rotor and may comprise either the group of electromagnets or group of permanent magnets. Also, while wound salient poles have been illustrated, windings may instead be provided in a non-salient slotted structure. It is to be understood that actual connections between the individual windings and the switched control unit in either of these arrangements has not been illustrated as such provisions are well within the knowledge of the artisan.

It should also be appreciated that particular electromagnet energization sequences can vary depending on various considerations. Energization of the electromagnets may be switched sequentially along the air gap periphery or in a different order. Electromagnet groups may all be energized at all times, although switched at individually programmed times. Conversely, individual electromagnets may be energized and de-energized at predetermined sequentially induced, randomly induced, or non-sequentially induced intervals.

Although the present invention has been exemplified herein in the context of a direct current motor, one of ordinary skill in the art would appreciate that the principles described are applicable to synchronous type alternating current motors and motors having wound elements energizable by a variety of pulse waveforms. Thus, the source of electrical power for driving the motor is not limited to a battery, but may include, for example, an alternating current source. Such an alternating current source can be converted to direct current or pulse waveform supply or can be used without such conversion to drive the motor as an alternating current synchronous motor.

What is claimed is:

1. A rotary electric motor comprising:
   a stator configured in the form of an annular ring of groups of electromagnet poles, the groups substantially equidistantly distributed along the angular extent of the annular ring, each of the groups comprising magnetic material magnetically isolated and separated from the other groups; and
   an annular rotor, concentric with an axis of rotation and concentric with the annular stator to form a radial air gap therebetween, comprising a plurality of groups of permanent magnet poles, the rotor groups substantially equidistantly distributed along the angular extent of the air gap, the permanent magnet poles of each group having a common magnetic return path that is isolated from the magnetic return paths of adjoining permanent magnet pole groups;
   wherein each group of stator electromagnet poles comprises windings that are switchably energized for driving electromotive interaction between the stator and rotor.

2. A rotary electric motor as recited in claim 1, wherein each rotor permanent magnet pole group comprises an even number of magnets that alternate in magnetic polarity.

3. A rotary electric motor as recited in claim 2, wherein the rotor comprises an even number of permanent magnet groups and the stator comprises an odd number of electromagnet groups.

4. A rotary electric motor as recited in claim 2 wherein the rotor poles in the rotor groups have pole faces separated by gaps substantially uniformly for all groups, the gaps being substantially equal to gaps between pole faces of adjacent groups.

5. A rotary electric motor as recited in claim 3, wherein all of the rotor groups contain the same number of poles and all the stator groups contain the same number of poles.

6. A rotary electric motor as recited in claim 5, wherein the number of poles in each rotor group is the same as the number of poles in each stator group.

7. A rotary electric motor as recited in claim 6, wherein the number of poles in each rotor group and stator group is two.

8. A rotary electric motor as recited in claim 6, wherein the number of poles in each rotor group and stator group is a multiple of two.

9. A rotary electric motor as recited in claim 6, wherein the number of poles in each rotor group and stator group is an odd multiple of two.

10. A rotary electric motor as recited in claim 1, further comprising a rotor position sensor, wherein signals for switching energization of the windings are generated in response to the sensor.

11. A rotary electric motor as recited in claim 10, wherein said position sensor comprises a resolver;
and said motor further comprises an encoder for generating said signals.

12. A rotary electric motor as recited in claim 1, wherein the angular distance between poles of each stator group is substantially uniform throughout the periphery of the stator and differs from the angular distance between stator poles of adjacent groups.

13. A rotary electric motor as recited in claim 12, wherein the angular distance between poles in each stator group is independent of the angular distance between adjacent permanent magnet poles of the rotor.

14. A rotary electric motor as recited in claim 13, wherein the angular distance between poles each stator group is different from the angular distance between adjacent permanent magnet poles of the rotor.

15. A rotary electric motor as recited in claim 1, wherein the stator poles have pole faces extending in substantially equal angular distance along the air gap and the rotor permanent magnet poles have pole faces extending in substantially equal angular distance along the air gap, the angular extent of the stator pole faces being different from the angular extent of the rotor pole faces.

16. A rotary electric motor as recited in claim 15, wherein the stator pole faces are separated by gaps, the gaps between adjacent stator pole faces within each group being substantially equal and different from the gaps between adjacent stator groups.

17. A rotary electric motor as recited in claim 16, wherein the rotor pole faces are separated by substantially uniform gaps throughout the angular extent of the rotor, the gaps between adjacent rotor pole faces being different from the gaps between adjacent stator pole faces within a stator group.

18. A rotary electric motor as recited in claim 1, wherein the rotor surrounds the stator.

19. A rotary electric motor as recited in claim 1, wherein each stator group is individually secured in the stator annular ring structure, thereby facilitating independent removal and replacement of an individual stator group.

20. A rotary electric motor as recited in claim 19, wherein said motor further comprises:
a plate member; and
a shaft member located at the axis of rotation;
wherein each of said stator groups is secured to said plate member at a spaced radial distance from the axis of rotation; and
said plate member is attached to said shaft member.

21. A rotary electric motor as recited in claim 20, wherein said spaced radial distance is greater than the radial distance between inner and outer boundary diameters of the stator annular ring.

22. A rotary electric motor as recited in claim 20, wherein the annular stator comprises an inner boundary at a first radial distance from the axis of rotation and an outer boundary at a second radial distance from the axis of rotation, and the radial distance between the inner and outer boundaries is less than said first radial distance.

23. A rotary electric motor as recited in claim 19, wherein said rotor further comprises an annular ring of nonmagnetic material, and said rotor groups are fixed to the inner surface of said ring of nonmagnetic material.

24. A rotary electric motor as recited in claim 23, wherein said motor further comprises a rotor housing, the rotor annular rotor being secured within the housing at a spaced radial distance from the axis of rotation, and the rotor housing is journalled for rotation about the shaft through bearings.

25. A rotary electric motor having a stator and a rotor, the motor comprising:
first and second annular ring members concentrically arranged about an axis of rotation and separated from each other by an radial air gap; wherein
said first member comprises groups of electromagnet poles, the groups substantially equidistantly distributed along its annular ring, each of the groups comprising magnetic material magnetically and electrically isolated and separated from the other groups;
said second member comprises a plurality of groups of permanent magnet poles substantially equidistantly distributed with alternating magnetic polarity within each group, each group of permanent magnet poles having a common magnetic return path that is isolated and separated from the magnetic return path of adjacent permanent magnet groups; and
wherein each group of electromagnet poles comprises windings that are switchably energized for driving electromotive interaction between the first and second members, in accordance with a sequential, non-sequential, or random excitation scheme.

26. A rotary electric motor as recited in claim 25, wherein the rotor surrounds the stator.

27. A rotary electric motor as recited in claim 26, wherein the stator comprises said first annular ring member and the rotor comprises said second annular ring member.

28. A rotary electric motor as recited in claim 27, wherein the annular stator comprises an inner boundary at a first radial distance from the axis of rotation and an outer boundary at a second radial distance from the axis of rotation, and the radial distance between the inner and outer boundaries is less than said first radial distance.

29. A rotary electric motor as recited in claim 26, wherein the stator comprises said second annular ring member and the rotor comprises said first annular ring member.

30. A rotary electric motor as recited in claim 25, wherein said groups of electromagnet poles are spaced from each other by an angular distance that is different from spacing between adjacent permanent magnet groups.

31. A rotary electric motor as recited in claim 25, wherein the number of permanent magnet groups is an even number and the number electromagnet groups is an odd number.

32. A rotary electric motor as recited in claim 31, wherein all groups contain the same number of magnetic poles.

* * * * *